United States Patent
Lan et al.

(10) Patent No.: US 10,627,873 B2
(45) Date of Patent: Apr. 21, 2020

(54) HINGE STRUCTURE AND ELECTRONIC DEVICE

(71) Applicants: Wei-Hao Lan, Taipei (TW); Che-Hsien Lin, Taipei (TW); Cheng-Shiue Jan, Taipei (TW)

(72) Inventors: Wei-Hao Lan, Taipei (TW); Che-Hsien Lin, Taipei (TW); Cheng-Shiue Jan, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 148 days.

(21) Appl. No.: 15/986,840

(22) Filed: May 23, 2018

(65) Prior Publication Data

US 2018/0341295 A1 Nov. 29, 2018

Related U.S. Application Data

(60) Provisional application No. 62/509,745, filed on May 23, 2017.

(51) Int. Cl.
*G06F 1/16* (2006.01)
*E05D 3/14* (2006.01)
(Continued)

(52) U.S. Cl.
CPC ............. *G06F 1/1681* (2013.01); *E05D 3/14* (2013.01); *E05D 7/00* (2013.01); *E05D 11/1028* (2013.01);
(Continued)

(58) Field of Classification Search
CPC ......... E05D 7/00; E05D 3/12; E05D 11/1028; E05D 3/14; G06F 1/1616; G06F 1/1601;
(Continued)

(56) References Cited

U.S. PATENT DOCUMENTS 882,721 A * 3/1908 Soss .......................... E05F 3/20
16/68
8,562,057 B1 10/2013 Schlater et al.

FOREIGN PATENT DOCUMENTS

CN 201206595 3/2009
CN 105491193 4/2016
(Continued)

OTHER PUBLICATIONS

Machine Translation of TWM545173 (Year: 2019).*
"Office Action of Taiwan Counterpart Application," dated Apr. 11, 2019, p. 1-p. 8.

*Primary Examiner* — Jinhee J Lee
*Assistant Examiner* — Ingrid D Wright
(74) *Attorney, Agent, or Firm* — JCIPRNET

(57) ABSTRACT

The present invention provides a hinge structure, which comprises a first pivoting assembly, a second pivoting assembly and a first bracket. The first pivoting assembly comprises multiple first piston components, multiple first pivoting arms and a first sliding shaft. Each of the first pivoting arms has a first elastic slot. A diameter of the first sliding shaft is greater than an aperture of the first elastic slot so as to generate a first torque. The first bracket has multiple first grooves separated from each other, and the first piston components are respectively disposed in the first grooves. When the first pivoting assembly pivots relative to the second pivoting assembly to an angle, the first grooves respectively press the first piston components so as to generate a second torque.

20 Claims, 9 Drawing Sheets

(51) Int. Cl.
　　　*E05D 7/00*　　　　(2006.01)
　　　*E05D 11/10*　　　(2006.01)
　　　*E05D 3/18*　　　　(2006.01)

(52) U.S. Cl.
　　　CPC .......... *G06F 1/1616* (2013.01); *G06F 1/1679* (2013.01); *E05D 3/186* (2013.01); *E05Y 2900/606* (2013.01)

(58) Field of Classification Search
　　　CPC .. G06F 1/1681; G06F 1/1684; Y10T 16/5474; Y10T 16/5475
　　　See application file for complete search history.

(56) References Cited

FOREIGN PATENT DOCUMENTS

| TW | M519688 | 4/2016 |
|---|---|---|
| TW | M545173 | 7/2017 |

\* cited by examiner

HINGE STRUCTURE AND ELECTRONIC DEVICE

CROSS-REFERENCE TO RELATED APPLICATION

This application claims the priority benefit of U.S. provisional application Ser. No. 62/509,745, filed on May 23, 2017. The entirety of the above-mentioned patent application is hereby incorporated by reference herein and made a part of this specification.

BACKGROUND OF THE INVENTION

1. Field of the Invention

The present invention relates to a pivoting structure and an electronic device, in particular to a hinge structure and an electronic device adopting the hinge structure.

2. Description of Related Art

Generally, a flip-type electronic device such as a notebook computer or a mobile phone generally uses a hinge structure to pivotally connect its display and the host body, and the user can use the hinge structure to open and close the two housings of the electronic device so as to use or store the electronic device. In detail, the general hinge structure provides a fixed torque output of the flip-type electronic device so that the display and the host body do not generate different torques due to different opening and closing positions during opening and closing. However, it may not be possible to stably fix the display to the predetermined position because of an insufficient torque of the hinge structure.

SUMMARY OF THE INVENTION

The present invention provides a hinge structure capable of generating a second torque in addition to the original first torque after pivoting to a specific angle so as to provide a sufficient torque.

The present invention also provides an electronic device, which comprises the aforementioned hinge structure and can increase the application and completeness of the situation.

The hinge structure of the present invention comprises a first pivoting assembly, a second pivoting assembly and a first bracket. The first pivoting assembly comprises multiple first piston components, multiple first pivoting arms and a first sliding shaft. The first pivoting arms and the first piston components are arranged alternately, wherein each of the first pivoting arms has a first elastic slot. The first sliding shaft passes through the first pivoting arms and the first piston components, and is located in the first elastic slot of each of the first pivoting arms. A diameter of the first sliding shaft is greater than an aperture of the first elastic slot so as to generate a first torque. The second pivoting assembly is pivotally connected with the first pivoting assembly. The first bracket has multiple first grooves separated from each other. The first piston components are respectively disposed in the first grooves. When the first pivoting assembly pivots relative to the second pivoting assembly to an angle, the first grooves respectively press the first piston components so as to generate a second torque.

In an embodiment of the present invention, the aforementioned first torque is a fixed value, and the second torque is a non-fixed value.

In an embodiment of the present invention, the aforementioned first elastic slot has a first aperture portion and a second aperture portion. An aperture of the first aperture portion is greater than an aperture of the second aperture portion, and the first sliding shaft is located in the first aperture portion.

In an embodiment of the present invention, the aforementioned first elastic slot is a closed slotted hole.

In an embodiment of the present invention, the aforementioned first pivoting assembly further comprises a first fixed shaft. The first fixed shaft passes through the first pivoting arms, wherein the first fixed shaft and the first sliding shaft are respectively located on a first end and a second end of each of the first pivoting arms.

In an embodiment of the present invention, the aforementioned pivoting assembly comprises multiple second piston components, multiple second pivoting arms, a second sliding shaft and a second fixed shaft. The second pivoting arms and the second pistons are arranged alternately, and each of the second pivoting arms has a second elastic slot. The second sliding shaft passes through the second pivoting arms and the second piston components and is located in the second elastic slot of each of the second pivoting arms. A diameter of the second sliding shaft is greater than an aperture of the second elastic slot. The second fixed shaft passes through the second pivoting arms. The second fixed shaft and the second sliding shaft are respectively located on a third end and a fourth end of each of the second pivoting arms.

In an embodiment of the present invention, the aforementioned hinge structure further comprises a second bracket. The second bracket has multiple second grooves separated from each other, wherein the second piston components are respectively disposed in the second grooves.

In an embodiment of the present invention, the aforementioned second elastic slot has a first aperture portion and a second aperture portion. An aperture of the first aperture portion is greater than an aperture of the second aperture portion, and the second sliding shaft is located in the first aperture portion.

In an embodiment of the present invention, the aforementioned second elastic slot is a closed slotted hole.

In an embodiment of the present invention, the aforementioned hinge structure further comprises a pair of fixing components. The pair of fixing components are respectively disposed on two opposite sides of the first pivoting assembly and the second pivoting assembly, and have a pair of first positioning holes, a pair of second positioning holes, a pair of first positioning slots and a pair of second positioning slots. Both ends of the first fixed shaft are respectively located in the first positioning holes.

Both ends of the second fixed shaft are respectively located in the second positioning holes. Both ends of the first sliding shaft are respectively located in the first positioning slots. Both ends of the second sliding shaft are respectively located in the second positioning slots.

In an embodiment of the present invention, when the aforementioned first pivoting assembly pivots relative to the second pivoting assembly, the first pivoting arms and the second pivoting aims rotate relatively, and the first sliding shaft and the second sliding shaft respectively move into the first positioning slots and the second positioning slots.

In an embodiment of the present invention, the aforementioned hinge structure further comprises a common shaft, wherein the common shaft passes through the first pivoting assembly and the second pivoting assembly.

In an embodiment of the present invention, the aforementioned first sliding shaft is located in the first elastic slot, so that the first elastic slot is elastically deformed to clamp the first sliding shaft so as to generate the first torque.

In an embodiment of the present invention, when the aforementioned first pivoting assembly pivots relative to the second pivoting assembly, the first piston components are suitable to move between a first piston aperture portion and a second piston aperture portion of the first grooves. An aperture of the first piston aperture portion is greater than an aperture of the second piston aperture portion, and a diameter of each of the first piston components is less than the aperture of the first piston aperture portion and greater than the aperture of the second piston aperture portion.

In an embodiment of the present invention, each of the aforementioned first piston components comprises an assembling portion and a guiding portion. The first sliding shaft passes through the assembling portion, and the guiding portion is located in the corresponding first groove and has a slot. An extension direction of the slot is parallel to an extension direction of the first groove.

In an embodiment of the present invention, when the aforementioned first pivoting assembly pivots relative to the second pivoting assembly not to the angle, each of the first piston components is located in the corresponding first piston aperture portion, so that the slot of the guiding portion is not pressed by the corresponding first groove so as not to generate elastic deformation.

In an embodiment of the present invention, when the aforementioned first pivoting assembly pivots relative to the second pivoting assembly to the angle, each of the first piston component moves from the corresponding first piston aperture portion to the second piston aperture portion so as to drive the first groove to press the guiding portion of the corresponding first piston component, so that the slot of the guiding portion generates elastic deformation so as to generate the second torque.

In an embodiment of the present invention, the shape of the slot includes a U shape or a rectangle.

The electronic device of the present invention comprises a first body, a second body and at least one hinge structure. The hinge structure is pivotally disposed between the first body and the second body. The hinge structure comprises a first pivoting assembly, a second pivoting assembly and a first bracket. The first pivoting assembly comprises multiple first piston components, multiple first pivoting arms and a first sliding shaft. The first pivoting arms and the first piston components are arranged alternately, and each of the first pivoting arms has a first elastic slot. The first sliding shaft passes through the first pivoting arms and the first piston components, and is located in the first elastic slot of each of the first pivoting arms. A diameter of the first sliding shaft is greater than an aperture of the first elastic slot so as to generate a first torque. The second pivoting assembly is pivotally connected with the first pivoting assembly. The first bracket has multiple first grooves separated from each other. The first piston components are respectively disposed in the first grooves. When the first pivoting assembly pivots relative to the second pivoting assembly to an angle, the first grooves respectively press the first piston components so as to generate a second torque.

In an embodiment of the present invention, one of the first body and the second body is a display screen, and the other one of the first body and the second body is a system host.

Based on the above, in the design of the hinge structure of the present invention, the diameter of the first sliding shaft of the first pivoting assembly is greater than the aperture of the first elastic slot so as to generate the first torque, the first piston components of the first pivoting assembly are respectively disposed in the first grooves of the first bracket, and when the first pivoting assembly rotates relative to the second pivoting assembly to the angle, the first grooves respectively press the first piston components so as to generate the second torque. Thereby, the torque of the hinge structure of the present invention can be adjusted adaptively, so that the first housing and the second housing of the electronic device using the hinge assembly can be fixed at a predetermined angle to increase the application and completeness of the situation.

In order to make the aforementioned and other objectives and advantages of the present invention comprehensible, embodiments accompanied with figures are described in detail below.

DESCRIPTION OF THE EMBODIMENTS

Figure 1A:
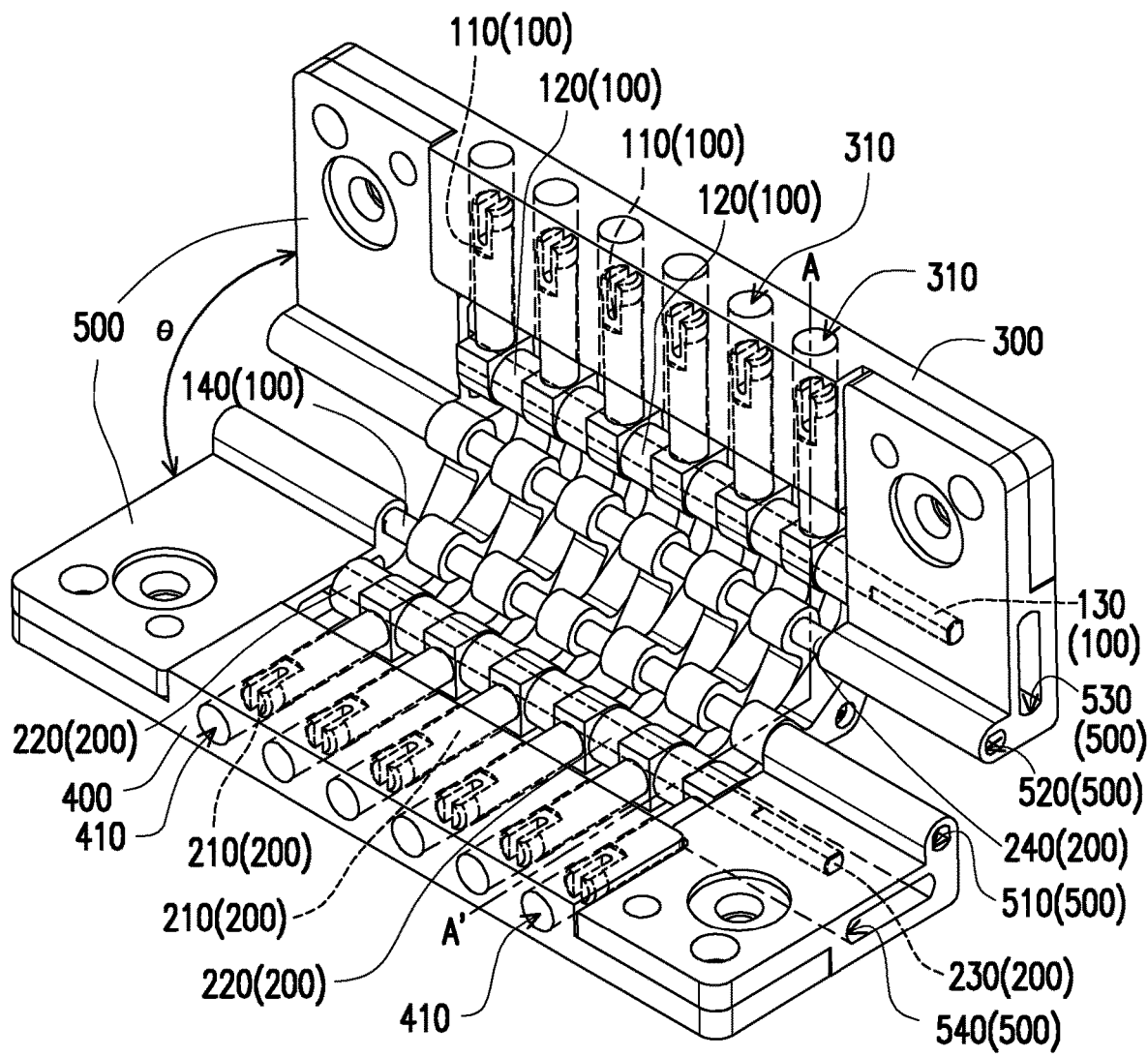
FIG. 1A is a perspective schematic view of a hinge structure according to an embodiment of the present invention.
Figure 1B:
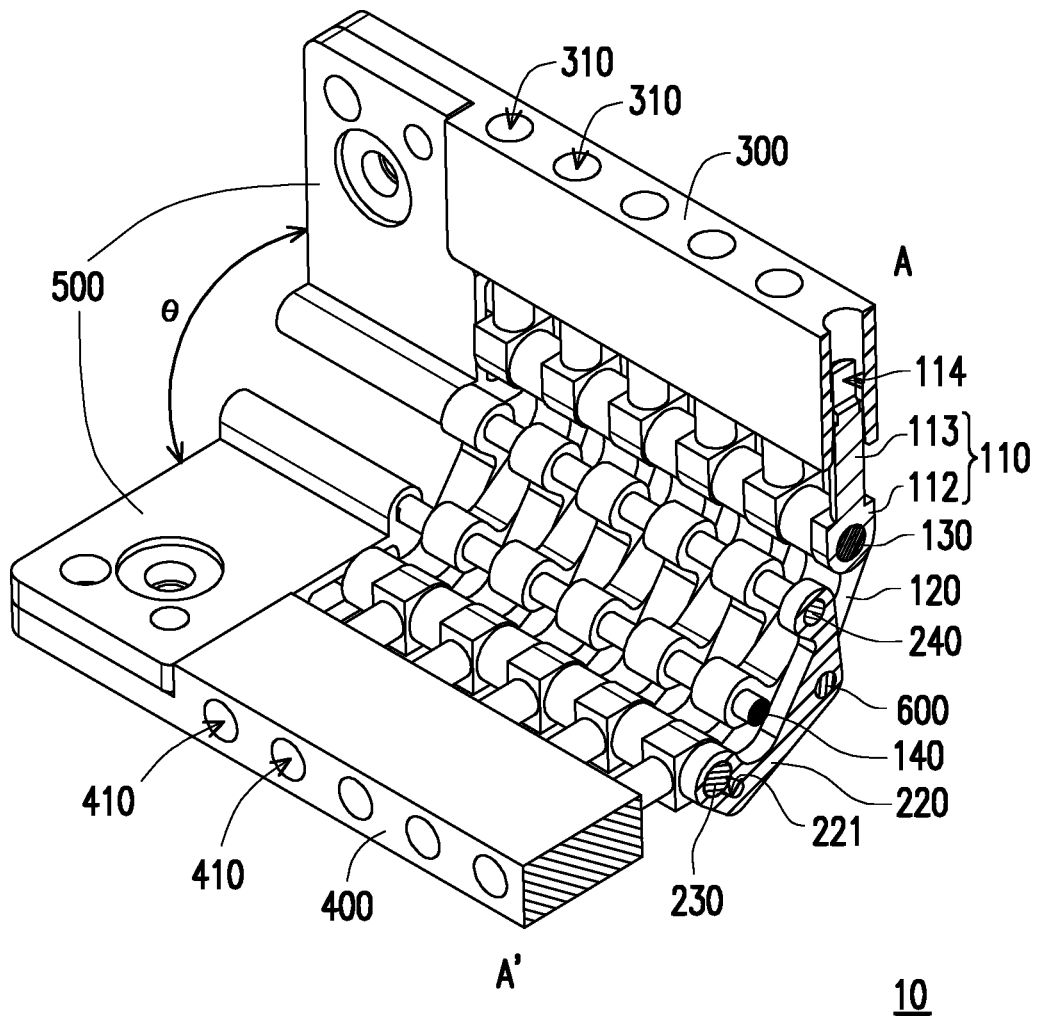
FIG. 1B is a partial cross-sectional perspective view taken along line A-A' of FIG. 1A.
Figure 1C:
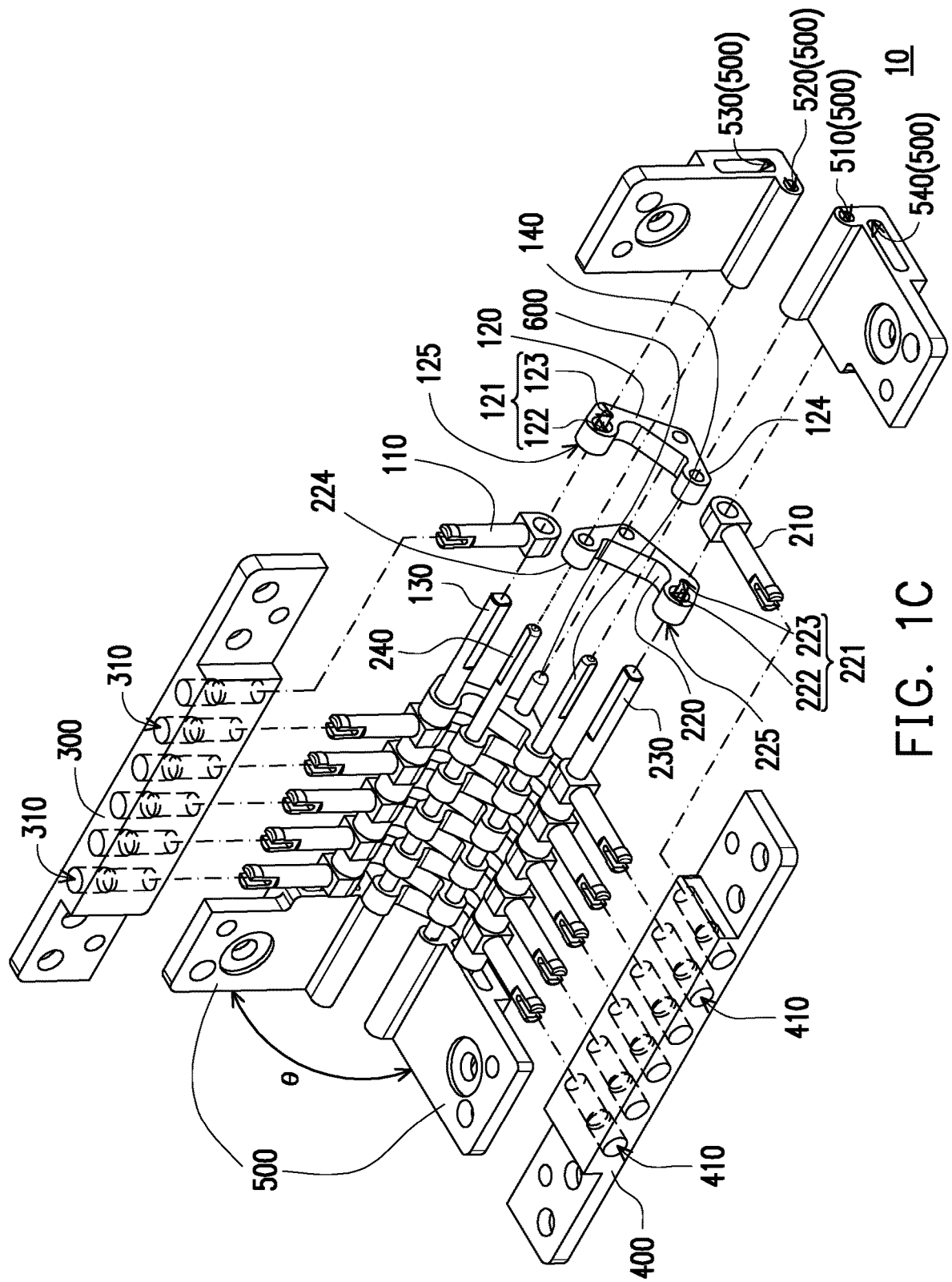
FIG. 1C is a partial perspective exploded view of the hinge structure of FIG. 1A.
Figure 1D:
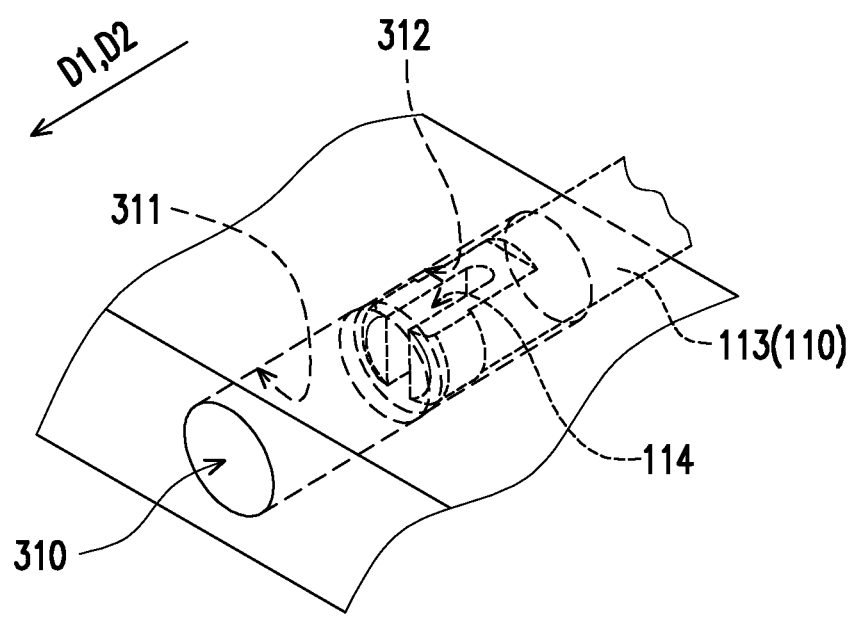
FIG. 1D is a partially enlarged schematic view of the first piston component and the first groove of the hinge structure of FIG. 1A.

FIG. 1A is a perspective schematic view of a hinge structure according to an embodiment of the present invention. FIG. 1B is a partial cross-sectional perspective view taken along line A-A' of FIG. 1A. FIG. 1C is a partial perspective exploded view of the hinge structure of FIG. 1A. FIG. 1D is a partially enlarged schematic view of the first piston component and the first groove of the hinge structure of FIG. 1A. Referring to FIG. 1A, FIG. 1B and FIG. 1C, the hinge structure 10 of the present embodiment comprises a first pivoting assembly 100, a second pivoting assembly 200 and a first bracket 300. The first pivoting assembly 100 comprises multiple first piston components 110, multiple first pivoting arms 120 and a first sliding shaft 130. The first pivoting arms 120 and the first piston components 110 are arranged alternately, wherein each of the first pivoting arms 120 has a first elastic slot 121. The first sliding shaft 130 passes through the first pivoting arms 120 and the first piston components 110, and is located in the first elastic slot 121 of each of the first pivoting arms 120. Particularly, the diameter of the first sliding shaft 130 is greater than the aperture of the first elastic slot 121 so as to generate a first torque. The second pivoting assembly 200 is pivotally connected with the first pivoting assembly 100. The first bracket 300 has multiple first grooves 310 separated from each other, wherein the first piston components 110 are respectively disposed in the first grooves 310. Particularly, when the first pivoting assembly 100 pivots relative to the second pivoting assembly 200 to an angle θ, the first grooves 310 respectively press the first piston components 110 so as to generate a second torque.

In detail, referring to FIG. 1B, FIG. 1C and FIG. 1D, the first piston component 110 of the present embodiment comprises an assembling portion 112 and a guiding portion 113. The first sliding shaft 130 passes through the assembling portion 112, and the guiding portion 113 is located in the corresponding first groove 310 and has a slot 114. Herein, the extension direction D1 of the slot 114 is parallel to the extension direction D2 of the first groove 310, and the shape of the slot 114 is, for example, a U shape or a rectangle, but is not limited thereto. Referring to FIG. 1C again, the first elastic slot 121 of the first pivoting arm 120 of the present embodiment has a first aperture portion 122 and a second aperture portion 123. The aperture of the first aperture portion 122 is greater than the aperture of the second aperture portion 123, and the first sliding shaft 130 is located in the first aperture portion 122. Herein, the first elastic slot 121 is embodied as a closed slotted hole. Since the diameter of the first sliding shaft 130 is greater than the aperture of the first elastic slot 121, which means an interference fit, the first sliding shaft 130 continuously stretches the first elastic slots 121, so that the first elastic slots 121 are elastically deformed to generate a constant clamping force to clamp the first sliding shaft 130, thereby generating the first torque. In other words, the first torque is a fixed value and can be considered as a continuous torque. Besides, the first pivoting assembly 100 further comprises a first fixed shaft 140, wherein the first fixed shaft 140 passes through the first pivoting arms 120, and the first fixed shaft 140 and the first sliding shaft 130 are respectively located on a first end 124 and a second end 125 of each of the first pivoting arms 120.

In addition, referring to FIG. 1C again, the second pivoting assembly 200 of the present embodiment comprises multiple second piston components 210, multiple second pivoting arms 220, a second sliding shaft 230 and a second fixed shaft 240. The second pivoting arms 220 and the second piston components 210 are arranged alternately, and each of the second pivoting arms 220 has a second elastic slot 221. The second elastic slot 221 has a first aperture portion 222 and a second aperture portion 223, wherein the aperture of the first aperture portion 222 is greater than the aperture of the second aperture portion 223, and the second sliding shaft 230 is located in the first aperture portion 222. Herein, the second elastic slot 221 is a closed slotted hole. The second sliding shaft 230 passes through the second pivoting arms 220 and the second piston components 210 and is located in the second elastic slot 221 of each of the second pivoting arms 220. The diameter of the second sliding shaft 230 is greater than the aperture of the second elastic slot 221 so as to generate the first torque. The second fixed shaft 240 passes through the second pivoting arms 220, wherein the second fixed shaft 240 and the second sliding shaft 230 are respectively located on a third end 224 and a fourth end 225 of each of the second pivoting arms 220. Preferably, the structural design of the second pivoting assembly 200 is identical to the structural design of the first pivoting assembly 100.

Referring to FIG. 1C and FIG. 1D again, the first groove 310 of the first bracket 300 of the present invention comprises a first piston aperture portion 311 and a second piston aperture portion 312, and the first piston components 110 of the first pivoting assembly 100 are suitable to respectively move between the first piston aperture portion 311 and the second piston aperture portion 312 of the first groove 310. Herein, the aperture of the first piston aperture portion 311 is greater than the aperture of the second piston aperture portion 312. The diameter of each of the first piston components 110 is less than the aperture of the first piston aperture portion 311 and greater than the aperture of the second piston aperture portion 312.

As shown in FIG. 1A, FIG. 1B and FIG. 1C, the hinge structure 10 of the present embodiment further comprises a second bracket 400, wherein the second bracket 400 has multiple second grooves 410 separated from each other, and the second piston components 210 are respectively disposed in the second grooves 410. Preferably, the structural design of the second piston components 210 and the second grooves 410 is identical to the structural design of the first piston components 110 and the first grooves 310, and thus, when the first pivoting assembly 100 pivots relative to the second pivoting assembly 200 to the angle θ, the second grooves 410 respectively press the second piston components 210 so as to generate the second torque. In other words, the hinge structure 10 of the present embodiment can be considered as a double torque structure. Since the second torque of the present embodiment is generated by the first grooves 310 respectively pressing the first piston components 110 and the second grooves 410 respectively pressing the second piston components 210 when the first pivoting assembly 100 pivots relative to the second pivoting assembly 200 to the angle θ, the second torque is a non-fixed value and can be considered as a sudden increase torque.

Besides, the hinge structure 10 of the present embodiment further comprises a pair of fixing components 500, which are respectively disposed on two opposite sides of the first pivoting assembly 100 and the second pivoting assembly 200 and have a pair of first positioning holes 510, a pair of second positioning holes 520, a pair of first positioning slots 530 and a pair of second positioning slots 540. Both ends of the first fixed shaft 140 are respectively located in the pair of first positioning holes 510, and both ends of the second fixed shaft 240 are respectively located in the pair of second positioning holes 520. Both ends of the first sliding shaft 130 are respectively located in the pair of first positioning slots 530, and both ends of the second sliding shaft 230 are respectively located in the pair of second positioning slots 540. In other words, the first pivoting assembly 100 can be fixed to the pair of fixing components 500 through the first sliding shaft 130 and the first fixed shaft 140, and the second pivoting assembly 200 can be fixed to the pair of fixing components 500 respectively through the second sliding shaft 230 and the second fixed shaft 240. In addition, the hinge structure 10 of the present embodiment further comprises a common shaft 600, wherein the common shaft 600 passes through the first pivoting assembly 100 and the second pivoting assembly 200, so that the first pivoting assembly 100 can pivot relative to the second pivoting assembly 200.

FIG. 2A to FIG. 2E are cross-sectional side views of an actuation flow of the hinge structure of FIG. 1A. FIG. 3A is an enlarged schematic view of the hinge structure of FIG. 2B from another viewing angle. FIG. 3B is an enlarged schematic view of the hinge structure of FIG. 2D from another viewing angle. The generation of the first torque and the second torque of the hinge structure 10 shall be described in detail with reference to FIGS. 2A to 2E and FIGS. 3A and 3B.

Figure 2A:
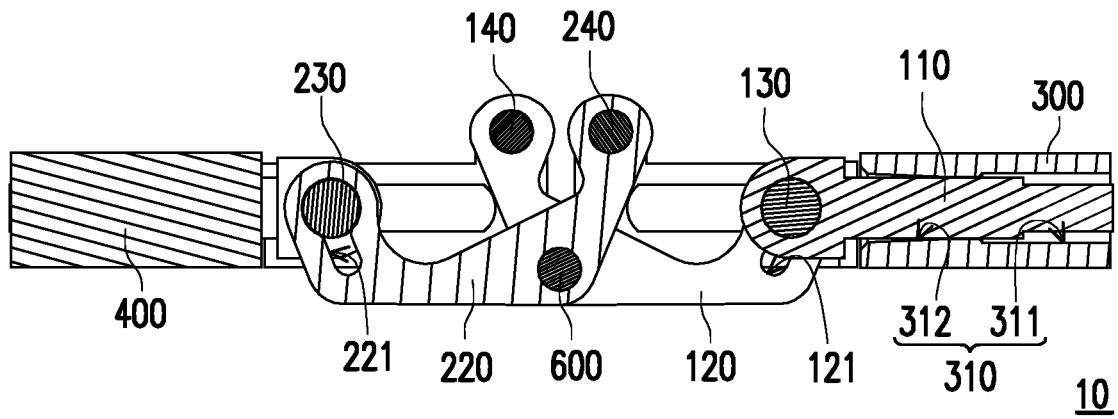
FIG. 2A to FIG. 2E are cross-sectional side views of an actuation flow of the hinge structure of FIG. 1A.
Figure 3A:
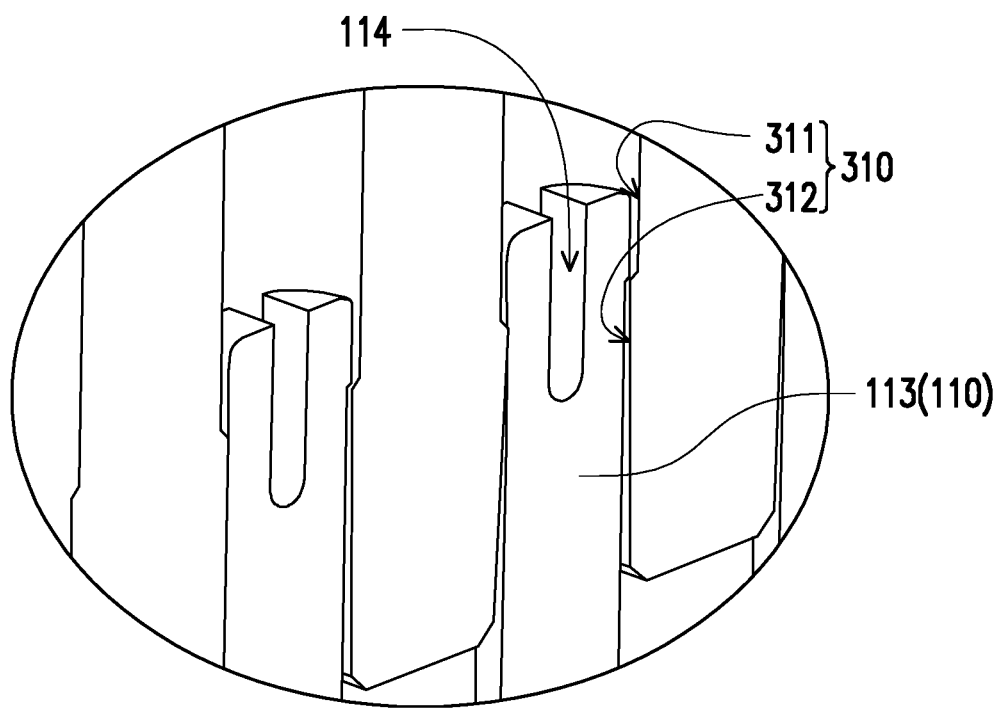
FIG. 3A is an enlarged schematic view of the hinge structure of FIG. 2B from another viewing angle.
Figure 3B:
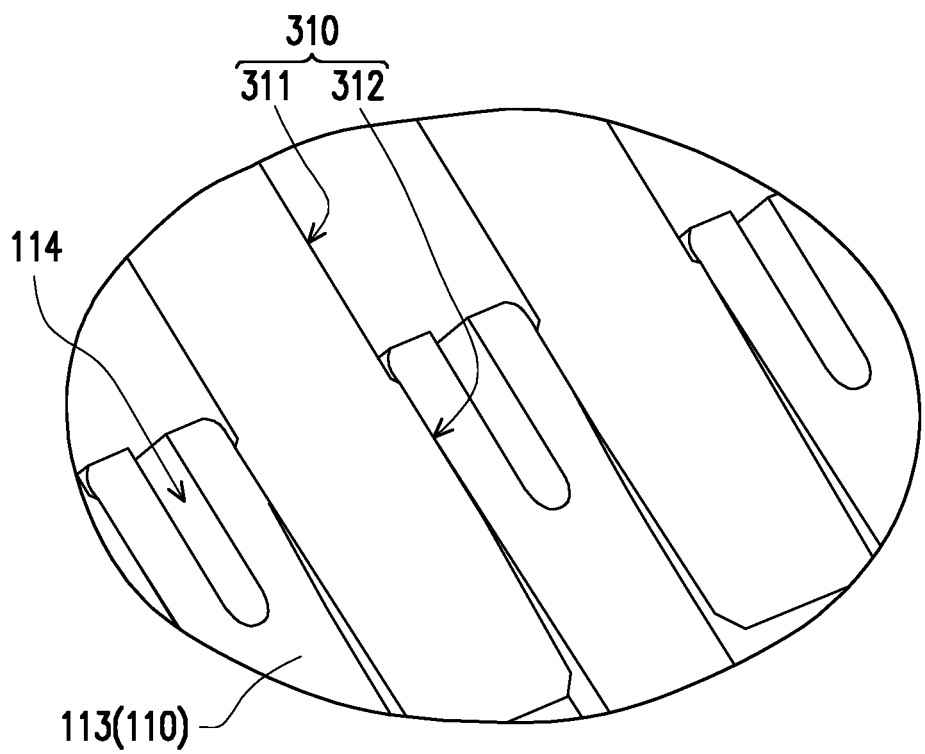
FIG. 3B is an enlarged schematic view of the hinge structure of FIG. 2D from another viewing angle.

Referring to FIG. 1C and FIG. 2A, when the first pivoting assembly 100 and the second pivoting assembly 200 are in a 180 degree state, since the diameter of the first sliding shaft 130 is greater than the aperture of the first elastic slot 121 and the diameter of the second sliding shaft 230 is greater than the aperture of the second elastic slot 221, which means an interference fit, the first sliding shaft 130 continuously stretches the first elastic slots 121 and the second sliding shaft 230 continuously stretches the second elastic slots 221, thereby generating the first torque. At this time, the slot 114 of the guiding portion 113 of the first piston component 110 is located in the corresponding first piston aperture portion 311, so that the slot 114 of the guiding portion 113 is not pressed by the corresponding first groove 310 so as not to generation elastic deformation. In other words, when the first pivoting assembly 100 pivots relative to the second pivoting assembly 200 not to the angle θ, the first piston components 110 are not pressed so as not to generate elastic deformation, so that no second torque is generated.

Figure 2B:
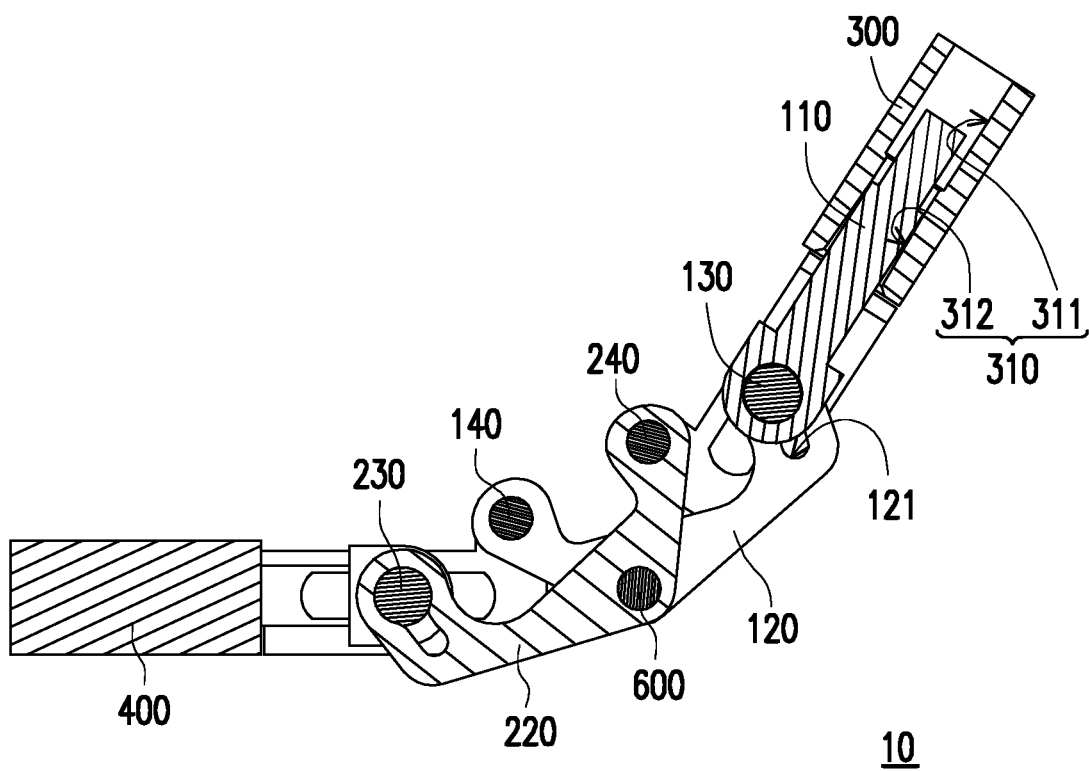

Then, referring to FIG. 1A and FIG. 2B, when the first pivoting assembly 100 pivots relative to the second pivoting assembly 200 from 180 degrees to the specific angle θ, the first pivoting arms 120 and the second pivoting arms 220 rotate relatively, and the first sliding shaft 130 and the second sliding shaft 230 respectively move into the pair of first positioning slots 530 and the pair of second positioning slots 540. In other words, when the first pivoting arms 120 and the second pivoting arms 220 rotate relatively, the first sliding shaft 130 and the second sliding shaft 230 only slide without rotating. That is to say, when the first pivoting assembly 100 pivots relative to the second pivoting assembly 200, the first pivoting arms 120 and the second pivoting arms 220 which rotate relatively, and the first sliding shaft 130 and the second sliding shaft 230 which do not rotate, generate relative rotational displacements. At this time, as shown in FIG. 3A, the guiding portion 113 of the first piston component 110 and the first piston aperture portion 311 of the first groove 310 form a clearance fit, which means that the first piston component 110 is not subjected to force, and therefore, no second torque is generated. Herein, the angle θ may be self-designed according to the demands of the user, and is not limited thereto.

Figure 2C:
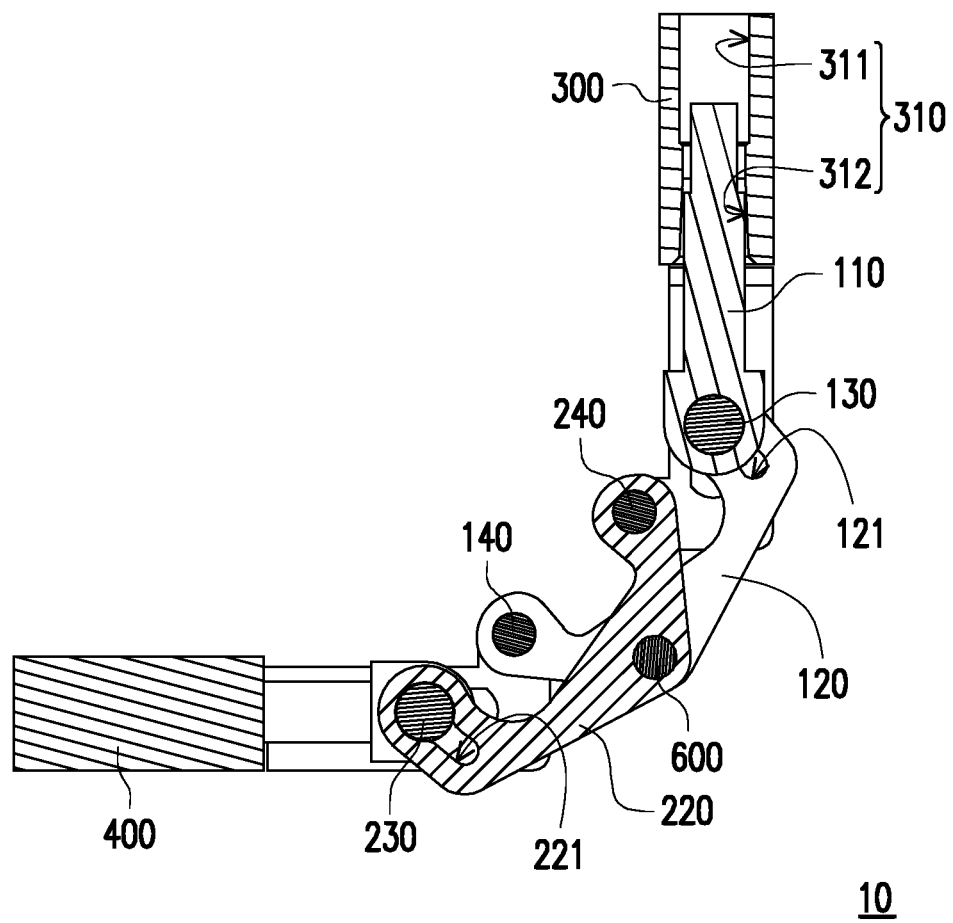
Figure 2D:
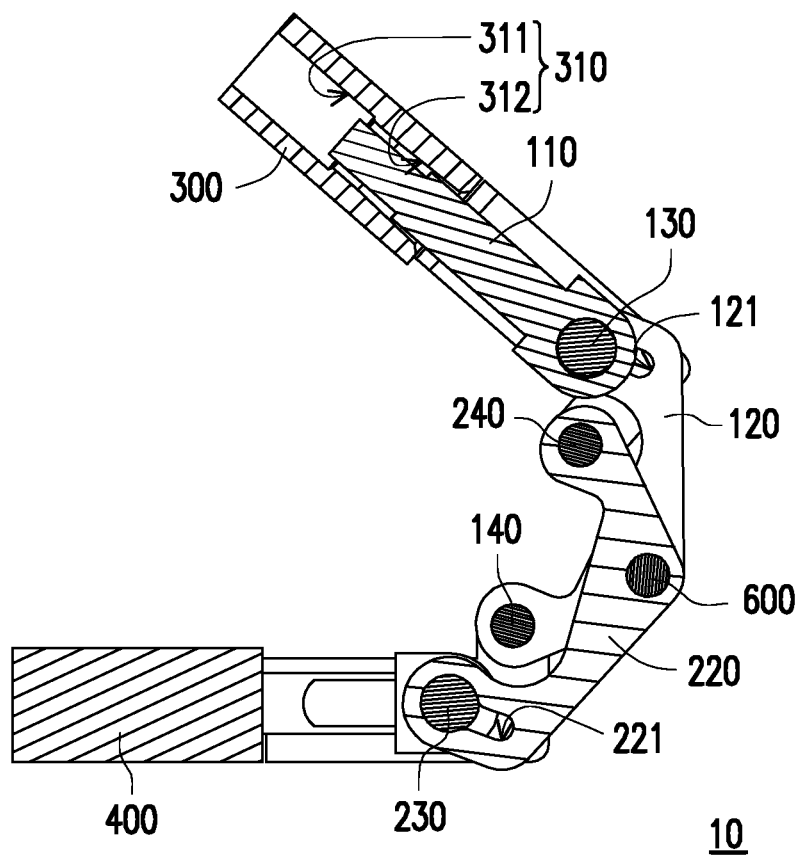

Then, referring to FIG. 1A, FIG. 2C and FIG. 2D, when the first pivoting assembly 100 pivots relative to the second pivoting assembly 200 to the specific angle θ, the first pivoting arms 120 and the second pivoting arms 220 rotate relatively, and the first sliding shaft 130 and the second sliding shaft 230 respectively move into the pair of first positioning slots 530 and the pair of second positioning slots 540. At this time, the first piston component 110 moves from the corresponding first piston aperture portion 311 to the second piston aperture portion 312 so as to drive the first groove 310 to press the guiding portion 113 of the corresponding first piston component 110, thereby generating the second torque. As shown in FIG. 3B, the guiding portion 113 of the first piston component 110 and the first piston aperture portion 311 of the first groove 310 form an interference fit, the slot 114 of the guiding portion 113 of the first piston component 110 is pressed to generate elastic deformation, thereby generating the second torque.

Figure 2E:
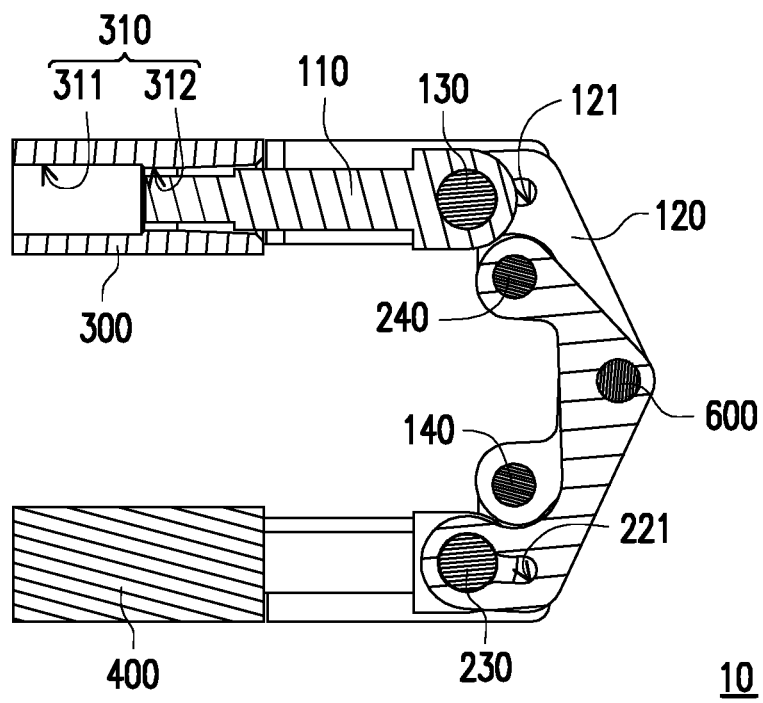

Finally, referring to FIG. 1A and FIG. 2E, when the first pivoting assembly 100 pivots relative to the second pivoting assembly 200 to overlie the second pivoting assembly 200, the guiding portion 113 of the first piston component 110 and the first piston aperture portion 311 of the first groove 310 still form an interference fit, and the slot 114 of the guiding portion 113 of the first piston component 110 is pressed to continuously generate elastic deformation.

Figure 4:
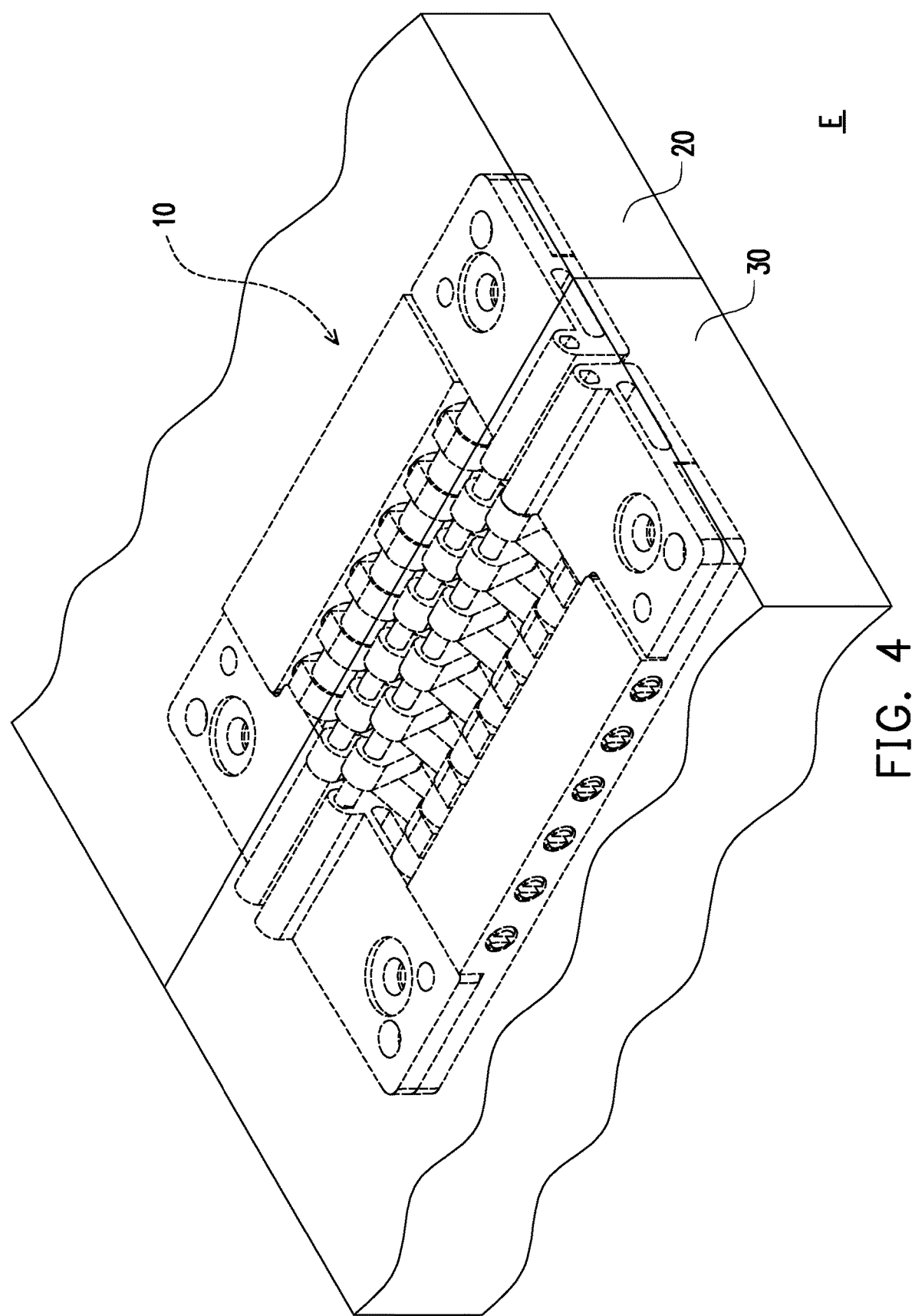
FIG. 4 is a schematic view of an electronic device according to an embodiment of the present invention.

FIG. 4 is a schematic view of an electronic device according to an embodiment of the present invention. It must be noted here that the following embodiments follow the reference numerals and partial contents of the preceding embodiments, wherein the same reference numerals are used to denote the same or similar elements, and the description of the same technical contents is omitted. For the description of the omitted part, reference may be made to the preceding embodiments, and the details will not be repeated in the following embodiments. Referring to FIG. 4, the electronic device E of the present embodiment comprises a first body 20, a second body 30 and at least one of the aforementioned hinge structures 10, wherein the hinge structure 10 is pivotally disposed between the first body 20 and the second body 30. Herein, one of the first body 20 and the second body 30 is a display screen, the other one of the first body 20 and the second body 30 is a system host, and the electronic device E is, for example, a notebook computer, but it is not limited thereto.

Since the electronic device E of the present embodiment has the hinge structure 10, in addition to the first torque having a fixed value, when the first pivoting assembly 100 pivots relative to the second pivoting assembly 200 to the angle θ, the first grooves 310 respectively press the first piston components 110 so as to generate the second torque. By using the hinge structure 10 to generate the second-stage torque change to compensate for the conventionally known loss of torque, the torque of the electronic device E can be adjusted adaptively,, and the application and completeness of the situation are increased.

Based on the above, in the design of the hinge structure of the present invention, the diameter of the first sliding shaft of the first pivoting assembly is greater than the aperture of the first elastic slot so as to generate the first torque, the first piston components of the first pivoting assembly are respectively disposed in the first grooves of the first bracket, and when the first pivoting assembly rotates relative to the second pivoting assembly to the angle, the first grooves respectively press the first piston components so as to generate the second torque. Thereby, the torque of the hinge structure of the present invention can be adjusted adaptively, so that the first housing and the second housing of the electronic device using the hinge assembly can be fixed to at a predetermined angle to increase the application and completeness of the situation.

Although the present invention has been disclosed as above with the embodiments, it is not intended to limit the present invention. Any person having ordinary skill in the art can make some changes and modifications without departing from the spirit and scope of the present invention. Therefore, the protection scope of the present invention shall be defined by the appended claims.

What is claimed is:

1. A hinge structure, comprising:
   a first pivoting assembly, comprising:
      multiple first piston components;
      multiple first pivoting arms, alternately arranged with the first piston components, wherein each of the first pivoting arms has a first elastic slot; and
      a first sliding shaft, passing through the first pivoting arms and the first piston components and located in the first elastic slot of each of the first pivoting arms, wherein a diameter of the first sliding shaft is greater than an aperture of the first elastic slot so as to generate a first torque;
   a second pivoting assembly, pivotally connected with the first pivoting assembly; and
   a first bracket, having multiple first grooves separated from each other, wherein the first piston components are respectively disposed in the first grooves, and when the first pivoting assembly pivots relative to the second pivoting assembly to an angle, the first grooves respectively press the first piston components so as to generate a second torque.

2. The hinge structure according to claim 1, wherein the first torque is a fixed value, and the second torque is a non-fixed value.

3. The hinge structure according to claim 1, wherein the first elastic slot comprises a first aperture portion and a second aperture portion, an aperture of the first aperture portion is greater than an aperture of the second aperture portion, and the first sliding shaft is located in the first aperture portion.

4. The hinge structure according to claim 1, wherein the first elastic slot is a closed slotted hole.

5. The hinge structure according to claim 1, wherein the first pivoting assembly further comprises:
  a first fixed shaft, passing through the first pivoting arms, wherein the first fixed shaft and the first sliding shaft are respectively located on a first end and a second end of each of the first pivoting arms.

6. The hinge structure according to claim 1, wherein the second pivoting assembly comprises:
  multiple second piston components;
  multiple second pivoting arms, arranged alternately with the second piston components, wherein each of the second pivoting arms comprises a second elastic slot;
  a second sliding shaft, passing through the second pivoting arms and the second piston components and located in the second elastic slot of each of the second pivoting arms, wherein a diameter of the second sliding shaft is greater than an aperture of the second elastic slot; and
  a second fixed shaft, passing through the second pivoting arms, wherein the second fixed shaft and the second sliding shaft are respectively located on a third end and a fourth end of each of the second pivoting arms.

7. The hinge structure according to claim 6, further comprising:
  a second bracket, comprising multiple second grooves separated from each other, wherein the second piston components are respectively disposed in the second grooves.

8. The hinge structure according to claim 6, wherein the second elastic slot comprises a second aperture portion and a second aperture portion, an aperture of the first aperture portion is greater than an aperture of the second aperture portion, and the second sliding shaft is located in the first aperture portion.

9. The hinge structure according to claim 6, wherein the second elastic slot is a closed slotted hole.

10. The hinge structure according to claim 6, further comprising:
  a pair of fixing components, respectively disposed on two opposite sides of the first pivoting assembly and the second pivoting assembly and comprising a pair of first positioning holes, a pair of second positioning holes, a pair of first positioning slots and a pair of second positioning slots, wherein both ends of the first fixed shaft are respectively located in the pair of first positioning holes, both ends of the second fixed shaft are respectively located in the pair of second positioning holes, both ends of the first sliding shaft are respectively located in the pair of first positioning slots, and both ends of the second sliding shaft are respectively located in the pair of second positioning slots.

11. The hinge structure according to claim 10, wherein when the first pivoting assembly pivots relative to the second pivoting assembly, the first pivoting arms and the second pivoting arms rotate relatively, and the first sliding shaft and the second sliding shaft respectively move into the pair of first positioning slots and the pair of second positioning slots.

12. The hinge structure according to claim 1, further comprising:
  a common shaft, passing through the first pivoting assembly and the second pivoting assembly.

13. The hinge structure according to claim 1, wherein the first sliding shaft is located in the first elastic slot, so that the first elastic slot is elastically deformed to clamp the first sliding shaft so as to generate the first torque.

14. The hinge structure according to claim 1, wherein when the first pivoting assembly pivots relative to the second pivoting assembly, the first piston components are suitable to move between a first piston aperture portion and a second piston aperture portion of the first grooves, an aperture of the first piston aperture portion is greater than an aperture of the second piston aperture portion, and a diameter of each of the first piston components is less than the aperture of the first piston aperture portion and greater than the aperture of the second piston aperture portion.

15. The hinge structure according to claim 14, wherein each of the first piston components comprises an assembling portion and a guiding portion, the first sliding shaft passes through the assembling portion, the guiding portion is located in the corresponding first groove and has a slot, and an extension direction of the slot is parallel to an extension direction of the first groove.

16. The hinge structure according to claim 15, wherein when the first pivoting assembly pivots relative to the second pivoting assembly not to the angle, each of the first piston components is located in the corresponding first piston aperture portion, so that the slot of the guiding portion is not pressed by the corresponding first groove so as not to generate elastic deformation.

17. The hinge structure according to claim 15, wherein when the first pivoting assembly pivots relative to the second pivoting assembly to the angle, each of the first piston component moves from the corresponding first piston aperture portion to the second piston aperture portion so as to drive the first groove to press the guiding portion of the corresponding first piston component, so that the slot of the guiding portion generates elastic deformation so as to generate the second torque.

18. The hinge structure according to claim 15, wherein the shape of the slot includes a U shape or a rectangle.

19. An electronic device, comprising:
  a first body;
  a second body; and
  at least one hinge structure, pivotally disposed between the first body and the second body, wherein the hinge structure comprises:
    a first pivoting assembly, comprising:
      multiple first piston components;
      multiple first pivoting arms, alternately arranged with the first piston components, wherein each of the first pivoting aims has a first elastic slot; and
      a first sliding shaft, passing through the first pivoting arms and the first piston components and located in the first elastic slot of each of the first pivoting arms, wherein a diameter of the first sliding shaft is greater than an aperture of the first elastic slot so as to generate a first torque;
    a second pivoting assembly, pivotally connected with the first pivoting assembly; and a first bracket, having multiple first grooves separated from each other, wherein the first piston components are respectively disposed in the first grooves, and when the first pivoting assembly pivots relative to the second pivoting assembly to an angle, the first grooves respectively press the first piston components so as to generate a second torque.

20. The electronic device according to claim 19, wherein one of the first body and the second body is a display screen, and the other one of the first body and the second body is a system host.

\* \* \* \* \*